(12) United States Patent
Dolton et al.

(10) Patent No.: US 8,067,844 B2
(45) Date of Patent: Nov. 29, 2011

(54) ENGINE GENERATOR SET (75) Inventors: Michael David Dolton, Holmfirth (GB);
Raj Chauhan, Groby (GB); Pierre Bernard French, Holmfirth (GB)

(73) Assignee: Cummins Turbo Technologies Limited, Huddersfield (GB)

( * ) Notice: Subject to any disclaimer, the term of this patent is extended or adjusted under 35 U.S.C. 154(b) by 0 days.

(21) Appl. No.: 12/707,151

(22) Filed: Feb. 17, 2010

(65) Prior Publication Data

US 2010/0140960 A1 Jun. 10, 2010

Related U.S. Application Data (63) Continuation of application No. PCT/GB2008/002577, filed on Jul. 28, 2008.

(30) Foreign Application Priority Data

Aug. 17, 2007 (GB) .................................. 0716060.9

(51) Int. Cl.
*F02N 11/06* (2006.01)
(52) U.S. Cl. .................................................... 290/40 R
(58) Field of Classification Search .................. 290/52, 290/40 R, 40 B; 60/601, 602, 607, 608, 605.2
See application file for complete search history.

(56) References Cited

U.S. PATENT DOCUMENTS

| 3,303,348 | A | * | 2/1967 | Cox et al. ..................... 290/40 R |
| 4,490,622 | A | * | 12/1984 | Osborn ........................... 290/52 |
| 4,743,161 | A |  | 5/1988 | Fisher et al. |
| 4,780,055 | A |  | 10/1988 | Zloch et al. |
| 4,989,406 | A | * | 2/1991 | Vdoviak et al. ................. 60/762 |
| 5,949,146 | A | * | 9/1999 | VandenBerghe ............ 290/40 R |
| 6,876,097 | B2 | * | 4/2005 | Thomas et al. ............. 290/40 A |
| 7,047,743 | B1 | * | 5/2006 | Stahlhut et al. ................. 60/608 |

(Continued)

FOREIGN PATENT DOCUMENTS

DE 299 17 625 3/2000

(Continued)

OTHER PUBLICATIONS

International Search Report, PCT/GB2008/002577, Oct. 17, 2008, Cummins Turbo Technologies Limited.

(Continued)

*Primary Examiner* — Julio Gonzalez
(74) *Attorney, Agent, or Firm* — Krieg DeVault LLP; Matthew D. Fair, Esq.

(57) ABSTRACT

An engine generator set comprises an internal combustion engine having an output shaft that is coupled to an electrical generator for producing an AC electrical power output. The engine is operable to rotate the shaft at a first rotational speed so that the generator is driven to produce electrical power at a first frequency and a second rotational speed at which the generator is driven to produce electrical power at a second frequency. An exhaust gas turbocharger is operatively connected to the engine and has a compressor with a housing that defines a gas inlet. At least two guide, vane assemblies that are releasably and interchangeably connectable to the inlet to match the compressor performance with the first or second engine speed. The guide vanes of the first guide vane assembly extend in a downstream direction towards the impeller wheel at an angle relative to the inlet that is different to the corresponding angle of the guide vanes second guide vane assembly.

15 Claims, 5 Drawing Sheets

U.S. PATENT DOCUMENTS

| | | | |
|---|---|---|---|
| 7,066,715 B2 * | 6/2006 | Martin et al. | 415/203 |
| 7,076,954 B1 * | 7/2006 | Sopko et al. | 60/607 |
| 7,562,528 B2 * | 7/2009 | Wood | 60/602 |
| 2002/0113439 A1 * | 8/2002 | Thomas et al. | 290/40 A |
| 2004/0070212 A1 * | 4/2004 | Kesseli | 290/52 |
| 2004/0206082 A1 | 10/2004 | Martin et al. | |
| 2005/0050887 A1 * | 3/2005 | Frank et al. | 60/597 |
| 2008/0054647 A1 * | 3/2008 | Kumar | 290/40 R |

FOREIGN PATENT DOCUMENTS

| | | |
|---|---|---|
| EP | 0685653 | 12/1995 |
| EP | 1416123 | 5/2004 |
| EP | 1598559 | 11/2005 |
| JP | 58 185934 | 10/1983 |
| JP | 62 253924 | 11/1987 |
| JP | 2005 023792 | 1/2005 |

OTHER PUBLICATIONS

United Kingdom Search Report, GB071606.9, Dec. 4, 2007, Cummins Turbo Technologies Limited.

The International Bureau of WIPO, International Preliminary Report on Patentability, Feb. 24, 2010.

European Patent Office, Written Opinion of the International Searching Authority, Feb. 24, 2010.

* cited by examiner

ENGINE GENERATOR SET

CROSS REFERENCE TO RELATED APPLICATIONS

The present application is a continuation of PCT/GB2008/002577 filed Jul. 28, 2008, which claims priority to United Kingdom Patent Application No. 0716060.9 filed Aug. 17, 2007, each of which are incorporated herein by reference.

The present invention relates to an engine generator set for generating electrical power and, in particular, to a method for operating the same. It also relates to a compressor for use in a turbocharger fitted to the engine of an engine generator set.

Engine generator sets (often referred to as "gen-sets") are used in many situations for generating electrical power when it is otherwise not available. They may be used in circumstances where there is no convenient available connection to the electrical power grid or as an emergency or stand-by power supply where uninterrupted power is imperative. One environment where they are widely employed is on construction sites where there is a need for the power generator to be a mobile source of power for tools and/or illumination etc. Generator sets comprise a prime mover, such as an internal combustion engine, in combination with an electrical generator, for example an alternator that provides an AC power output.

Engine gen-sets are configured so as to be able to supply electrical power that matches the local rating (voltage and frequency) of the national electricity grid. Many gen-sets are designed able to operate with both the 60 Hz electrical system used in some countries such as the USA and the 50 Hz electrical system used in other parts of the world such as, for example, Europe. In each case, the engine of the gen-set is individually tuned for a single synchronous speed. For example, a four-pole generator is driven at 1800 rpm with a 60 Hz power supply or 1500 rpm at 50 Hz and so the engine, which is directly coupled to the input of the alternator, is operated so that its output shaft rotates at that speed. When the gen-set is moved between two different electrical systems its settings have to be modified and the engine has to be re-tuned to operate at the different speed. When the engine is turbocharged this generally means that the turbocharger has to be changed.

A turbocharger is a well-known device for supplying air to the intake of an internal combustion engine at pressures above atmospheric (boost pressures) and is widely used on automobiles and the like. A compressor is joined to a turbine via a central bearing housing. The turbine comprises a turbine housing that houses a turbine wheel. Similarly the compressor comprises a housing that houses an impeller wheel. The turbine and compressor impeller wheels are mounted on opposite ends of a common turbocharger shaft, the shaft being supported on bearing assemblies in the bearing housing. The turbine housing is provided with an exhaust gas inlet and an exhaust gas outlet. The inlet directs incoming exhaust gas from an internal combustion engine to an annular inlet chamber surrounding the turbine wheel. The exhaust gas flows through the turbine and into the outlet via a circular outlet opening that is coaxial with the turbine wheel. This drives the turbine wheel in rotation, which, in turn, rotates the compressor impeller. Air is drawn through an axial inlet and delivers compressed air to the intake manifold of the internal combustion engine, via an annular outlet volute, thereby increasing engine power.

Turbochargers are matched to a rated engine speed. In relation to the compressor this means that its flow characteristics have to match the "swallowing capacity" of the engine, which is a function of its operating speed. The performance of a given compressor is characterised by a compressor map that is a graphical plot of air flow rate against the pressure ratio for a range of impeller rotation speeds.

One aspect of turbocharger control is to ensure stable operation by avoiding what is known as "surge". If the turbocharger is operating at a relatively low compressor speed (i.e. low volumetric air flow rate) and a high boost pressure the air flow into the compressor may stall and the operation of the compressor is interrupted. Following stall, the air flow tends to reverse through the compressor until a stable pressure ratio is reached at which the air can flow in the correct direction. This process repeats and results in pulsations in the air flow known as surging. Maximum operating efficiency of the engine is achieved by operating close to the surge limit and a surge margin is built into the control process to ensure that the turbocharger operates at a safe distance from the surge condition. Thus, in the context of a gen-set, when the output electrical frequency rating is changed it is necessary to change the turbocharger for one with a different rating to ensure that the engine continues to operate efficiently.

It is an object of the present invention to provide for an improved or alternative engine generator set that is capable of operating to generate different electrical outputs.

According to a first aspect of the present invention there provided an engine generator set comprising an internal combustion engine having an output shaft that is coupled to an electrical generator for producing an AC electrical power output, the engine being operable to rotate the shaft at a first rotational speed so that the generator is driven to produce electrical power at a first frequency and a second rotational speed at which the generator is driven to produce electrical power at a second frequency, the engine being operatively connected to an exhaust gas turbocharger, the turbocharger comprising an engine exhaust gas turbine connected to a compressor for rotation therewith, the compressor having a housing defining a gas inlet for directing gas flow to an impeller wheel mounted for rotation in the housing about an axis and an outlet for delivering compressed gas to the engine, wherein the compressor further comprises interchangeable first and second guide vane assemblies that are each releasably and selectively connectable to the inlet, guide vanes of the guide vane assemblies extending in a downstream direction from a leading edge towards the impeller wheel, the guide vanes of the first guide vane assembly extending in a first direction relative to the gas inlet and the guide vanes of the second guide vane assembly extending in a second direction relative to the gas inlet.

Interchanging of the guide vanes affects the direction of gas flow that reaches the impeller wheel. Replacing the first guide vane assembly with the second guide vane assembly can thus be used to change the performance of the compressor in a manner that ensures that it matches the engine speed.

When the guide vane assemblies are connected the guide vanes may be disposed in, or adjacent to, the inlet.

The guide vanes of the guide vane assemblies may extend in a downstream direction from their leading edges at an angle to a plane that substantially passes through the axis of the impeller wheel and substantially through the leading edge of the vane, the guide vanes of the first guide vane assembly being disposed at a first angle relative to said plane and the guide vanes of the second guide vane assembly disposed at a second angle relative to the plane, the second angle being different to the first angle.

The gas is typically air. The angle of the guide vanes of the first or the second guide vane assembly relative to the plane includes positive and negative angles as well as zero degrees.

The first and second angles may be respectively positive and negative relative to the plane such that the guide vanes of the two assemblies, in use, direct the gas in different swirl directions.

The guide vane assembly may comprise an array of guide vanes and an inlet extension for connection to the inlet of the compressor housing. The inlet extension may be releasably connectable to the inlet by a connecting member. The connecting member may be a band that is disposed around the inlet at an intersection between the inlet and the inlet extension.

The guide vanes may be fixed.

The guide vane assembly may comprise an array of guide vanes disposed in a guide vane housing that is slidably insertable into the inlet of the compressor housing.

The inlet, inlet extension and/or the guide vane housing may be substantially annular.

The guide vanes may extend radially outwards from a support disposed so as to be co-axial with the inlet towards an inner surface of the guide vane housing. The support may be a nose cone.

One of the first or second guide vane assemblies may have vanes arranged at 0° degrees relative to the plane.

In at least one of the vane assemblies the vanes are disposed at an angle to the plane so as to induce a pre-swirl.

The guide vanes may be disposed in an inducer of the inlet of the compressor.

According to a second aspect of the present invention there is provided a compressor kit for an exhaust gas turbocharger for operation in an engine generator set, the engine generator set comprising an internal combustion engine having an output shaft that is coupled to an electrical generator for producing an AC electrical power output, the engine being operable to rotate the shaft at a first rotational speed so that the generator is driven to produce electrical power at a first frequency and a second rotational speed at which the generator is driven to produce electrical power at a second frequency, the engine being operatively connected the turbocharger, the compressor being connectable to a turbine of the turbocharger for rotation therewith, the compressor kit comprising a compressor having a housing defining an gas inlet for directing gas flow to an impeller wheel mounted for rotation in the housing about an axis and an outlet for delivering compressed gas to the engine, wherein the compressor kit further comprises first and second interchangeable guide vane assemblies that are selectively and releasably connectable to the inlet, guide vanes of the guide vane assemblies extending in a downstream direction from a leading edge towards the impeller wheel, the guide vanes of the first guide vane assembly extending in a first direction relative to the gas inlet and the guide vanes of the second guide vane assembly extending in a second direction relative to the gas inlet.

The guide vanes of the guide vane assemblies may extend at an angle to a plane that substantially passes through the axis of the impeller wheel and substantially through the leading edge of the respective vane, the guide vanes of the first guide vane assembly being disposed at a first angle relative to said plane and the guide vanes of the second guide vane assembly being disposed at a second angle relative to said plane, the second angle being different to the first angle.

According to a third aspect of the present invention there is provided a method for operating an engine generator set to generate AC electrical power at a first frequency or a second frequency, the engine being operatively connected to an exhaust gas turbocharger, the turbocharger comprising an engine exhaust gas turbine connected to a compressor for rotation therewith, the compressor having a housing defining an inlet for directing gas flow to an impeller wheel for rotation about an axis in the housing and an outlet for delivering compressed gas to the engine, the method comprising the steps of configuring the engine to operate with an output shaft rotating at a first rotational speed so that the generator is driven to produce electrical energy at a first frequency, reconfiguring the engine generator set so that the engine operates with its output shaft rotating at a second rotational speed so that the generator is driven to produce electrical energy at a second frequency, and releasably connecting a guide vane assembly to the compressor inlet, the guide vanes of the guide vane assembly extending in a downstream direction from a leading edge towards the impeller wheel, the guide vanes extending in a direction relative to the gas inlet that is selected so as to match the compressor operation to the second rotational speed of the engine.

The guide vanes may extend at an angle to a plane that substantially passes through the axis of the impeller wheel and substantially through the leading edge of the vane, The method may comprise the step of removing a first guide vane assembly from the inlet and replacing it with a second guide vane assembly, the guide vanes of the first guide vane assembly being disposed at a first angle relative to said plane and the guide vanes of the second guide vane assembly being disposed to the plane at a second angle that is different to the first angle.

The guide vane assembly may be removably inserted into the compressor inlet. Alternatively, or in addition, the guide vane assembly may comprise an extension wall that is releasably connected to an end of inlet.

Other advantageous features of the invention will be apparent from the following description.

A specific embodiment of the present invention will now be described, by way of example only, with reference to the accompanying drawings, in which:

FIG. 6b is a compressor map plot comparing the efficiency of the compressor configurations in FIG. 6a.

Figure 1:
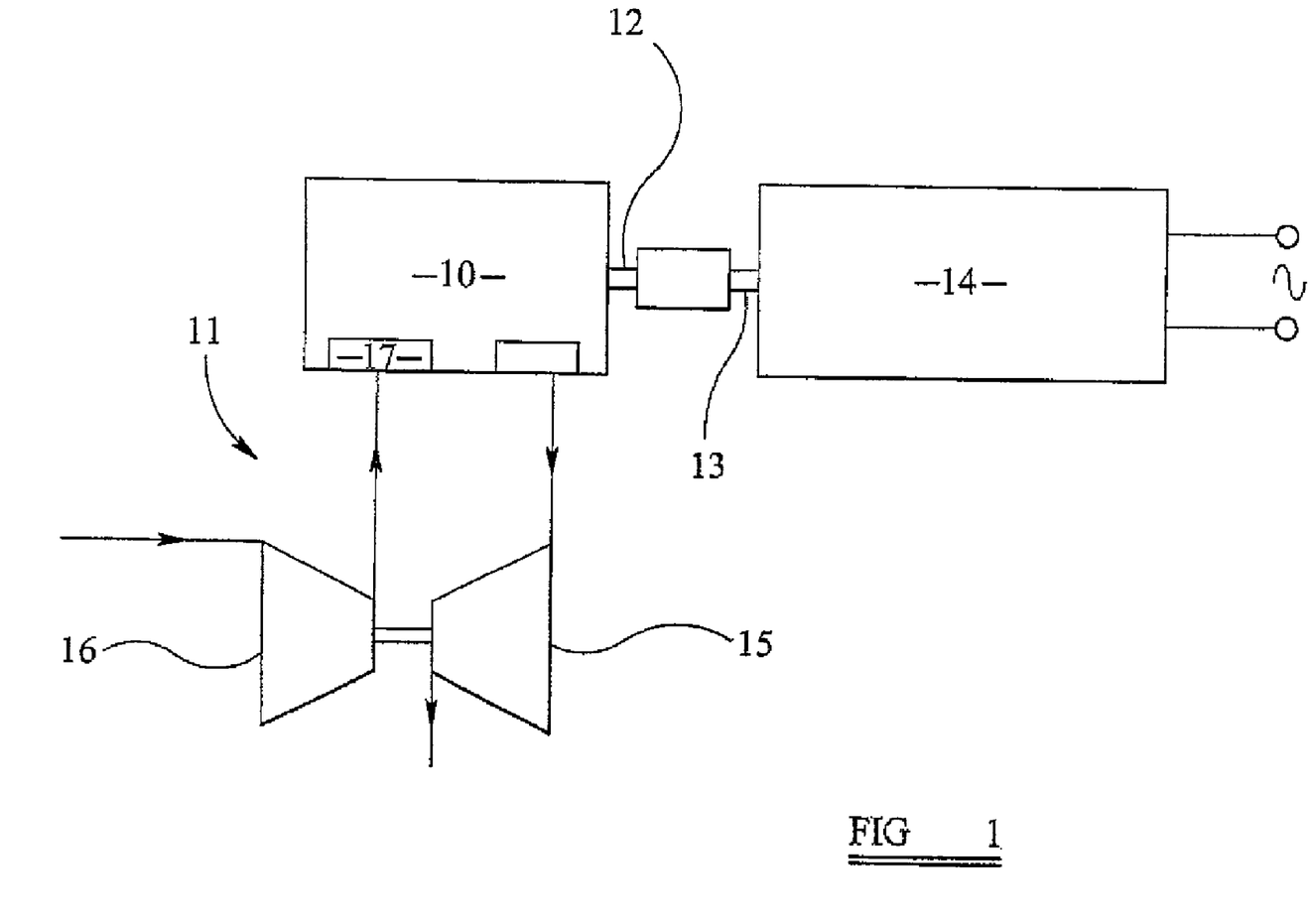
FIG. 1 is a schematic representation of an engine generator set in accordance with the present invention.

Referring to FIG. 1, the exemplary engine generator set comprises a diesel powered internal combustion engine 10 fitted with an exhaust gas turbocharger 11, the output shaft 12 of the engine being coupled to the input 13 of an alternator 14 for converting the mechanical power of the rotating shaft 12 into a three phase alternating electrical current. The generator set is configured such that it can generate three-phase current at 50 Hz or 60 Hz. In order to do this the engine 10 is configurable to operate at two distinct speeds each corresponding to the required frequency of the electrical supply.

The exhaust gas of the internal combustion engine drives a turbine wheel 15 of the turbocharger 11 in rotation in a conventional manner. The turbine wheel 15 in turn drives a compressor 16 in rotation so as to provide compressed air to the intake 17 of the internal combustion engine 10 at pressures above atmospheric (boost pressures).

An impeller wheel of the compressor 16 is disposed in a compressor housing 18 that is shown in more detail on FIGS. 2 to 5. The impeller wheel has been removed for clarity but the space it occupies is generally indicated by reference numeral 19 and the axis about which it rotates is indicated by reference numeral 20. The wheel typically has a plurality of vanes each of which has an outer edge that sweeps across a housing inner surface 21 when the impeller wheel rotates about the axis 20.

The compressor housing 18 defines an axial inlet 22 through which air is drawn in towards the impeller wheel where it is compressed and redirected to an annular outlet volute 23 surrounding the impeller wheel. From there the compressed air is delivered to the intake manifold 17 of the internal combustion engine 10 so as to increase engine power The inlet 22 of the compressor housing 18 shown in FIGS. 2 to 5 has an integral map-width enhanced (MWE) inlet structure of known configuration. It comprises an outer annular wall 25 extending upstream of the impeller space 19 and defining an intake for air and a concentric axial inner annular wall 26 which extends part way into the intake 25 and defines the compressor inducer. An annular flow passage 27 is defined around the inducer 26 between the inner and outer walls and is known as the MWE passage. The passage 27 is open to the intake portion 25 of the inlet 22 at its upstream end and closed at its downstream end by an end wall 28 that is part of the housing 16, but communicates with the impeller wheel via a discontinuous slot 29 formed through the inner wall 26 at a position adjacent to the end wall 28.

An MWE structure of this kind is well known and described in more detail in, for instance, U.S. Pat. No. 4,743, 161. The arrangement is such that the annular flow passage 27 defined between the two annular inlet sections 25, 26 is open at its upstream end and is in communication with the inner surface 21 of the compressor housing 18 that faces the impeller wheel 19. In operation at relatively high r.p.m., the pressure in the compressor housing 18 falls below atmosphere and air flows in through the annular flow path 27 thus increasing the volume of air being compressed by the impeller. At relatively low r.p.m. excess air tends to bleed out of the housing, through the discontinuous slot 29, along the annular flow path 27 and is recirculated to the intake 25.

It is well known that the MWE structure stabilises the performance of the compressor increasing the maximum flow capacity and improving the surge margin, i.e. decreasing the flow at which the compressor surges, so that the range of engine r.p.m. over which the compressor can operate in a stable manner is increased. A given compressor can thus be matched to engines with a wider speed range. This is known as increasing the width of the compressor "map", which is a plot of the compressor characteristic.

The compressor housing 18 described above is conventional and, in the context of the present invention, it is modified by the inclusion of a guide vane assembly 40 that is releasably connectable to the compressor housing. The assembly 40 comprises an annular outer extension wall 41 that provides an extension to the outer annular wall 25 of the compressor housing inlet 22, and a plurality of guide vanes 42 concentrically disposed in an annular shroud 43 that is configured to be received in the inducer 26.

Figure 2:
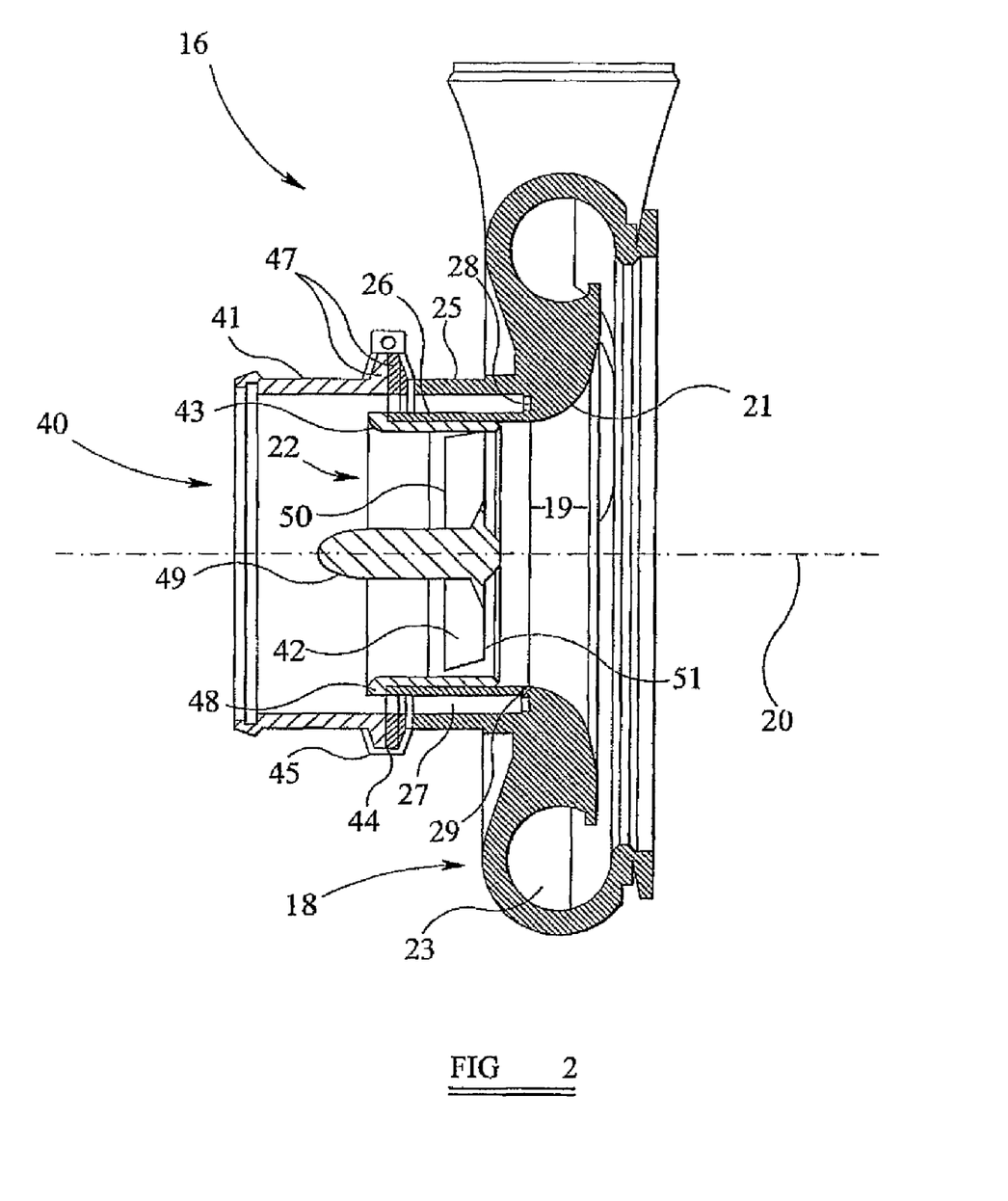
FIG. 2 is a sectioned side view of a compressor for a turbocharger used in the engine generator set of FIG. 1.
Figure 3:
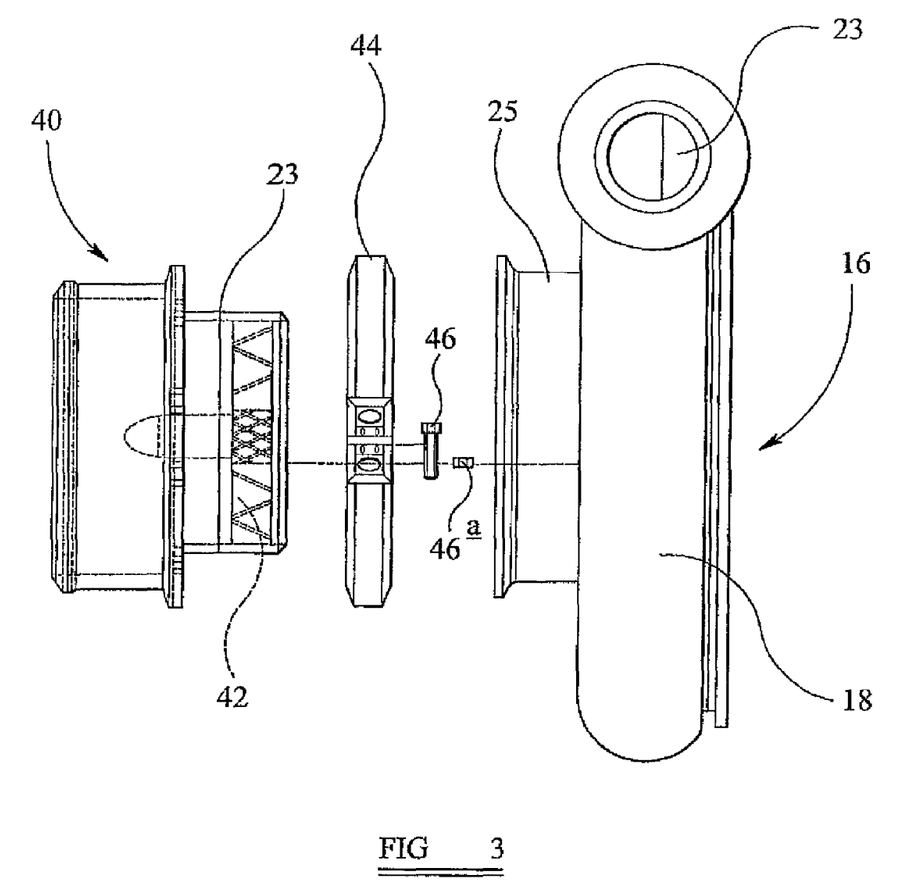
FIG. 3 is an exploded side view of the compressor of FIG. 2.
Figure 4:
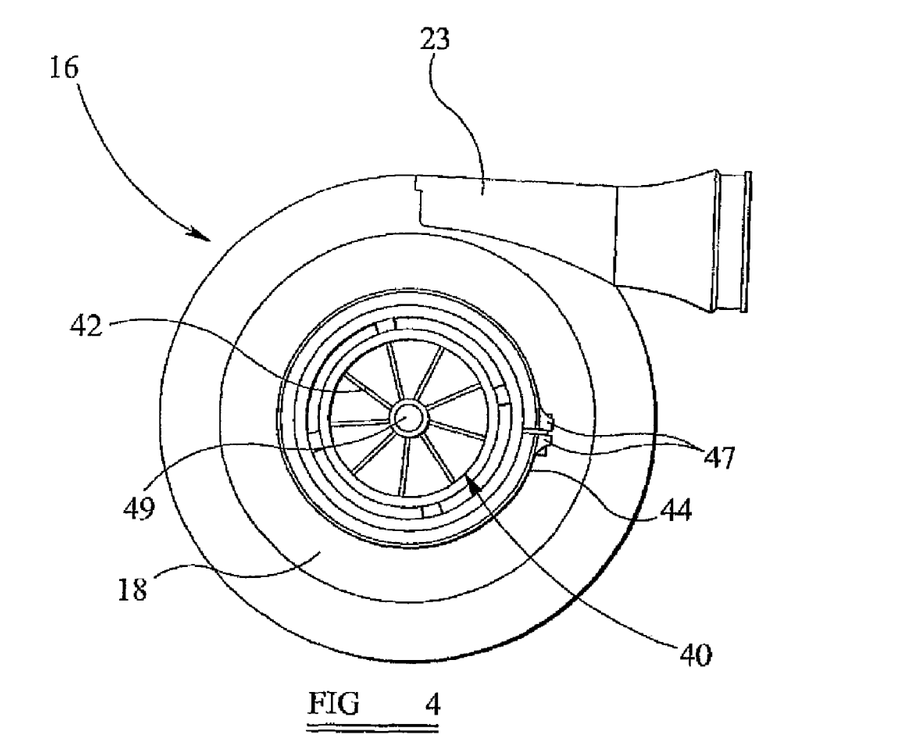
FIG. 4 is a front view of the compressor of FIG. 2.

The extension wall 41 of the guide vane assembly 40 connects co-axially with the intake 25 such that it is aligned with the outer annular wall 25 by a V-band 44 or the like disposed around its outer surface at a ridged interface 45 between the walls 25, 41. In order to retain the extension wall 41 in place the V-band 44 is fastened tight by a bolt 46 that passes through threaded lugs 47 defined on each end of the band 44 and secured by nut 46a. At the same time the shroud 43 is inserted into the inducer 26 and for this purpose it has an outside surface with a diameter very slightly less than the inside surface of the inducer wall 26 so it is received therein in a friction fit. A circumferential lip 48 at a leading edge of the shroud 43 abuts the front edge of the inducer 26 so as to limit the depth of its insertion and additional fixing bolts may be provided to hold it in place, if necessary. The guide vanes 42 extend in a generally radial direction between a central nose cone 49 and towards the inner surface of the shroud 43 and also axially in the direction of the inflow of air from a leading edge 50 (that extends in a radial direction) to a trailing edge 51, without any inclination to the flow direction. That is, the vane is disposed at 0° relative to the plane that passes through the rotational axis of the impeller and through the leading edge 50 of a given vane.

The guide vane assembly 40 is designed to be easily removable from the inducer 26 by simply releasing the V-band 44 so that the outer walls 25, 41 can be separated and the shroud insert 43 can be slid out of the inducer. It is to be understood that the guide vane assembly 40 may be connected to the compressor housing inlet 22 in any convenient fashion including being inserted in the manner of the shroud insert 43 and/or being connected to the inlet 22 in a similar manner to the extension wall 41. The present invention has application to a compressor without an MWE passage in which case there may be only a single annular wall defining the inlet to which the guide vane assembly 40 is connected or inserted.

In practice, the generator set is supplied with two different interchangeable guide vane assemblies 40 for the compressor 16 of the turbocharger 11 so that the compressor can be matched to the two engine speeds for which the generator set can be configured.

Figure 5:
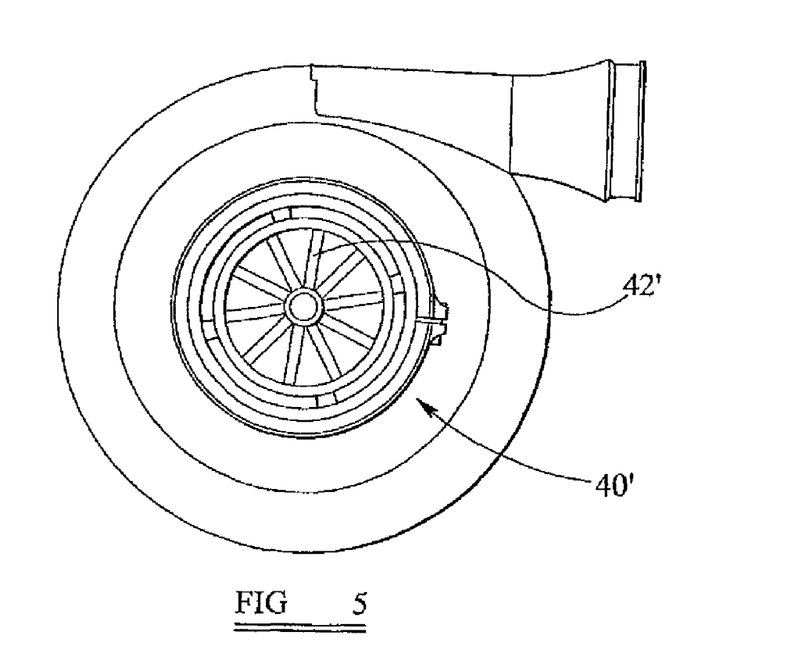
FIG. 5 is a front view of the compressor of FIG. 2 but fitted with an alternative guide vane assembly.

A second guide vane assembly 40' is shown fitted to the compressor housing 18 in FIG. 5. In this instance the vanes 42' are swept forward by 20° to the axial direction so as to redirect the air flow before it encounters the compressor impeller wheel and generate a pre-swirl. Each vane is thus disposed at 20° relative to the plane that intersects the axis of rotation of the compressor impeller wheel and the leading edge 50 of the vane concerned.

Figure 6A:
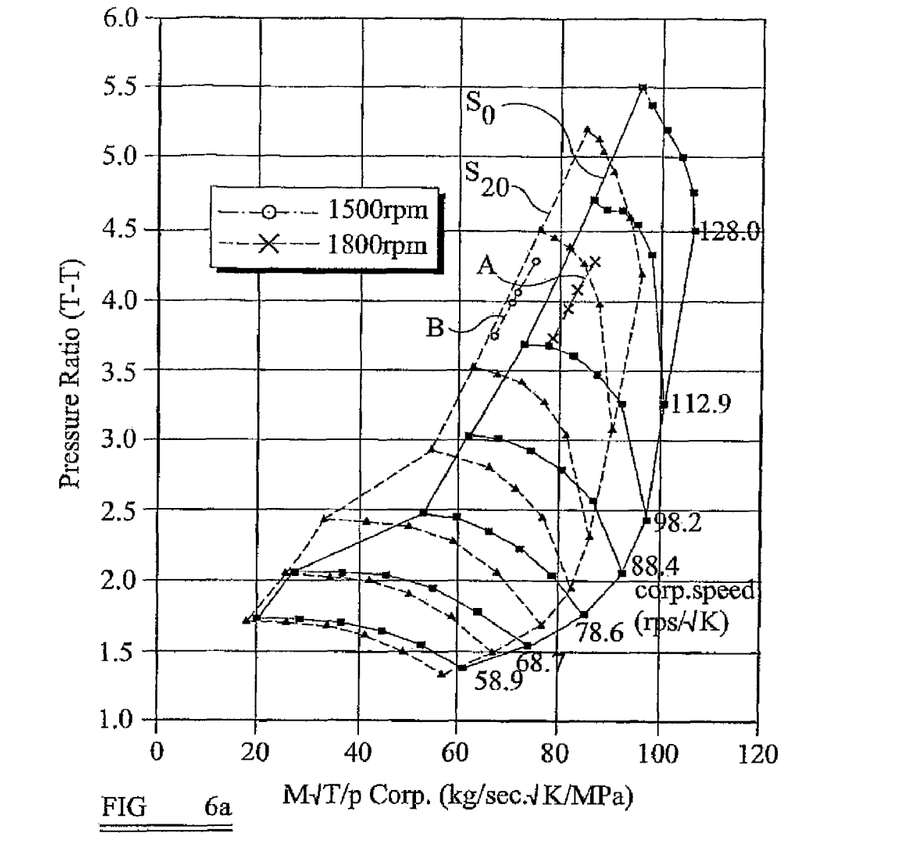
FIG. 6a is a compressor map plot comparing the performance of the compressor fitted with a 0° guide vane and 20° guide vane and illustrating the points of operation of the compressor at 1500 rpm and 1800 rpm.
Figure 6B:
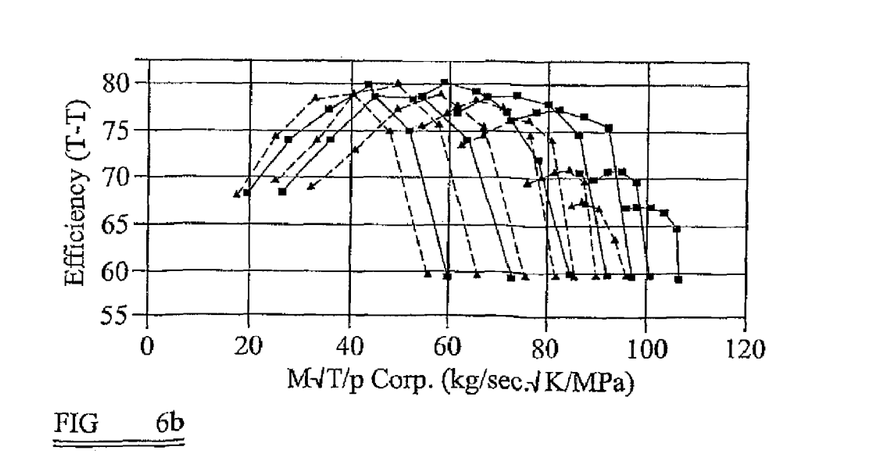

The inventive aspect of the present invention is most aptly illustrated by the compressor maps shown in FIGS. 6a and 6b. In FIG. 6a, air flow rate through the compressor (x-axis) is plotted against the pressure ratio from the compressor inlet to outlet for a range of rotation speeds for a compressor with a guide vane assembly 40 in which the vanes 42 have a 0° inclination to the flow and an overplot is shown for the same compressor fitted with the other guide vane assembly 40' in which the vanes 42' are inclined at 20°. The left hand line of each map represents the flow rates at which the compressor will surge at different speeds and is known as the surge line ($S_0$ and $S_{20}$ respectively) in each case. The map additionally shows a plot of the compressor operating points in an engine gen-set environment for an engine (and therefore compressor impeller) speed of 1800 rpm (indicated by reference A) and the same for an engine speed of 1500 rpm (indicated by reference B). The compressor with 0° guide vane assembly is tuned for operation with the engine at 1800 rpm and the operating points are disposed to the right of the surge line $S_0$ with a small surge margin. However, if the engine generator set is then switched to generate a different AC frequency power supply such that the engine speed is changed to 1500 rpm it can be seen that the corresponding plot of operating points falls to the left of the surge line $S_0$ and therefore outside the operating envelope of the compressor. The solution is to replace the 0° guide vane assembly 40 with the 20° guide vane assembly 40' which has the effect of moving the map to the left as shown. In particular the surge line moves to the left as indicated at $S_{20}$ and the 1500 rpm line then fits in the map envelope with a reasonable surge margin.

A compressor can thus be matched easily to the change in engine speed of the engine generator set without having to replace the compressor or the turbocharger or to rebuild the engine and turbocharger combination. The benefits of this in terms of time and cost savings will be evident.

In practice, it is envisaged that the compressor of the turbocharger is matched to the higher of the two engine speeds with a guide vane assembly of 0° inclination and a second interchangeable guide vane assembly with guide vanes of any suitable positive or negative inclination supplied with the gen-set to allow the compressor and turbocharger to operate at the lower engine speed. However, the possibility of using a first guide vane assembly with a positive or negative vane inclination is not discounted.

A first guide vane assembly may have a positive vane inclination so as to provide pre-swirl in one rotational direction (e.g. clockwise) and a second guide vane assembly may have a negative vane inclination so as to provide pro-swirl of the air in the other rotational direction (e.g. anti-clockwise). The respective assemblies may be designed to have angles that are in effect equi-distant from the turbocharger design point.

It will be appreciated that numerous modifications to the above described designs may be made without departing from the scope of the invention as defined in the appended claims. For example, the exact size, shape and arrangement of the guide vanes may be vary according the application and conditions of use. Moreover, the engine generator set may be operated by a microprocessor-based monitor and control system. This can be arranged to monitor a speed sensor to detect the speed of rotation of the engine shaft and to have a feedback control loop that ensures the engine speed is maintained at the desired rate.

The invention claimed is:

1. An engine generator set comprising an internal combustion engine having an output shaft that is coupled to an electrical generator for producing an AC electrical power output, the engine being operable to rotate the shaft at a first rotational speed so that the generator is driven to produce electrical power at a first frequency and a second rotational speed at which the generator is driven to produce electrical power at a second frequency, the engine being operatively connected to an exhaust gas turbocharger, the turbocharger comprising an engine exhaust gas turbine connected to a compressor for rotation therewith, the compressor having a housing defining a gas inlet for directing gas flow to an impeller wheel mounted for rotation in the housing about an axis and an outlet for delivering compressed gas to the engine, wherein the compressor further comprises interchangeable first and second guide vane assemblies that are each releasably and selectively connectable to the inlet, guide vanes of the guide vane assemblies extending in a downstream direction from a leading edge towards the impeller wheel, the guide vanes of the first guide vane assembly extending in a first direction relative to the gas inlet and the guide vanes of the second guide vane assembly extending in a second direction relative to the gas inlet.

2. An engine generator set according to claim 1, wherein the guide vanes of the guide vane assemblies extend in a downstream direction from their leading edges at an angle to a plane that substantially passes through the axis of the impeller wheel and substantially through the leading edge of the vane, the guide vanes of the first guide vane assembly being disposed at a first angle relative to said plane and the guide vanes of the second guide vane assembly disposed at a second angle relative to the plane, the second angle being different to the first angle.

3. An engine generator set according to claim 1, wherein the guide vane assembly comprises an array of guide vanes and an inlet extension for connection to the inlet of the compressor housing.

4. An engine generator set according to claim 3, wherein the inlet extension is releasably connectable to the inlet by a connecting member.

5. An engine generator set according to claim 4, wherein the connecting member is a band that is disposed around the inlet at an intersection between the inlet and the inlet extension.

6. An engine generator set according to claim 1, wherein at least one of the guide vane assemblies comprises an array of guide vanes disposed in a guide vane housing that is slidably insertable into the inlet of the compressor housing.

7. An engine generator set according to claim 1, wherein the inlet of the compressor housing is substantially annular.

8. An engine generator set according to claim 3, wherein the inlet extension is substantially annular.

9. An engine generator set according to claim 6, wherein the guide vane housing is substantially annular.

10. An engine generator set according to claim 1, wherein the compressor inlet comprises an outer wall defining an intake and an inner wall defining an inducer, the guide vanes being disposed in said inducer.

11. An engine generator set according to claim 1, wherein the guide vanes extend outwards from a support disposed so as to be co-axial with the inlet towards an inner surface of the guide vane housing.

12. An engine generator set according to claim 11, wherein the support is a nose cone.

13. An engine generator set according to claim 1, wherein one of the first or second guide vane assemblies has vanes arranged at 0° degrees to a plane that substantially passes through the axis of the impeller wheel and substantially through the leading edge of the vane.

14. A compressor kit for an exhaust gas turbocharger for operation in an engine generator set, the engine generator set comprising an internal combustion engine having an output shaft that is coupled to an electrical generator for producing an AC electrical power output, the engine being operable to rotate the shaft at a first rotational speed so that the generator is driven to produce electrical power at a first frequency and a second rotational speed at which the generator is driven to produce electrical power at a second frequency, the engine being operatively connected the turbocharger, the compressor being connectable to a turbine of the turbocharger for rotation therewith, the compressor kit comprising a compressor having a housing defining an gas inlet for directing gas flow to an impeller wheel mounted for rotation in the housing about an axis and an outlet for delivering compressed gas to the engine, wherein the compressor kit further comprises first and second interchangeable guide vane assemblies that are selectively and releasably connectable to the inlet, guide vanes of the guide vane assemblies extending in a downstream direction from a leading edge towards the impeller wheel, the guide vanes of the first guide vane assembly extending in a first direction relative to the gas inlet and the guide vanes of the second guide vane assembly extending in a second direction relative to the gas inlet.

15. A compressor kit according to claim 14, wherein the guide vanes of the guide vane assemblies extend at an angle to a plane that substantially passes through the axis of the impeller wheel and substantially through the leading edge of the respective vane, the guide vanes of the first guide vane assembly being disposed at a first angle relative to said plane and the guide vanes of the second guide vane assembly being disposed at a second angle relative to said plane, the second angle being different to the first angle.

* * * * *